United States Patent
Horne

(10) Patent No.: US 7,349,931 B2
(45) Date of Patent: Mar. 25, 2008

(54) SYSTEM AND METHOD FOR SCANNING OBFUSCATED FILES FOR PESTWARE

(75) Inventor: Jefferson Delk Horne, Boulder, CO (US)

(73) Assignee: Webroot Software, Inc., Boulder, CO (US)

(*) Notice: Subject to any disclaimer, the term of this patent is extended or adjusted under 35 U.S.C. 154(b) by 79 days.

(21) Appl. No.: 11/105,978

(22) Filed: Apr. 14, 2005

(65) Prior Publication Data

US 2006/0236397 A1    Oct. 19, 2006

(51) Int. Cl.
*G06F 17/30* (2006.01)
*G06F 11/00* (2006.01)

(52) U.S. Cl. .................. 707/205; 726/23; 726/22; 726/24

(58) Field of Classification Search .............. 707/1, 707/9, 10, 205; 711/3, 163; 713/150, 161, 713/189, 190, 194, 340; 717/140; 726/22, 726/23, 24, 25

See application file for complete search history.

(56) References Cited

U.S. PATENT DOCUMENTS

| | | |
|---|---|---|
| 5,442,669 A | 8/1995 | Medin |
| 5,485,575 A | 1/1996 | Chess et al. |
| 5,696,822 A | 12/1997 | Nachenberg |
| 5,826,013 A | 10/1998 | Nachenberg |
| 6,192,512 B1 | 2/2001 | Chess |
| 6,253,258 B1 | 6/2001 | Cohen |
| 6,357,008 B1 | 3/2002 | Nachenberg |
| 6,457,174 B1 | 9/2002 | Kuroda et al. |
| 6,681,972 B1 | 1/2004 | Tapocik |
| 6,735,703 B1 | 5/2004 | Kilpatrick et al. |
| 6,775,780 B1 | 8/2004 | Muttik |
| 6,851,057 B1 | 2/2005 | Nachenberg |
| 6,931,540 B1 | 8/2005 | Edwards et al. |
| 6,971,019 B1 | 11/2005 | Nachenberg |
| 6,973,577 B1 | 12/2005 | Kouznetsov |
| 6,973,578 B1 | 12/2005 | McIchione |
| 7,150,045 B2 | 12/2006 | Koelle et al. |
| 7,155,742 B1 | 12/2006 | Szor |

(Continued)

OTHER PUBLICATIONS

Rabek et al., Detection of Injected, Dynamically Generated, and Obfuscated Malicious Code, 2003, ACM, pp. 76-82.*

(Continued)

*Primary Examiner*—Shahid Alam
*Assistant Examiner*—Fred I Ehichioya
(74) *Attorney, Agent, or Firm*—Faegre & Benson LLP

(57) ABSTRACT

Systems and methods for managing multiple related pestware processes on a protected computer are described. In one implementation, a plurality of files in a file storage device of a protected computer are scanned and obfuscated files are identified from among the plurality of files. To identify whether the obfuscated file is a pestware file, one or more potential pestware processes are identified as being associated with the obfuscated file, and the one or more associated process are scanned so as to determine whether the processes, and hence, the obfuscated file, are pestware. In variations, the obfuscated file is analyzed to identify the start address of the associated one or more processes, and the start address is utilized as a reference point from which information located at one or more offsets from the start address is analyzed so as to determine whether the one or more processes are known pestware.

16 Claims, 3 Drawing Sheets

U.S. PATENT DOCUMENTS

| | | | |
|---|---|---|---|
| 7,171,690 | B2 | 1/2007 | Kouznetsov et al. |
| 7,178,166 | B1 | 2/2007 | Taylor et al. |
| 7,216,367 | B2 | 5/2007 | Szor |
| 2002/0120871 | A1 | 8/2002 | Watkins et al. |
| 2003/0023865 | A1 | 1/2003 | Cowie et al. |
| 2003/0046558 | A1 | 3/2003 | Teblyashkin et al. |
| 2003/0074573 | A1 | 4/2003 | Hursey et al. |
| 2003/0110391 | A1 | 6/2003 | Wolff et al. |
| 2003/0115479 | A1 | 6/2003 | Edwards et al. |
| 2003/0120952 | A1 | 6/2003 | Tarbotton et al. |
| 2003/0212902 | A1 | 11/2003 | Made |
| 2003/0217286 | A1 | 11/2003 | Carmona et al. |
| 2003/0233566 | A1 | 12/2003 | Kouznetsov et al. |
| 2004/0015712 | A1 | 1/2004 | Szor |
| 2004/0030912 | A1 | 2/2004 | Merkle |
| 2004/0068664 | A1 | 4/2004 | Nachenberg et al. |
| 2004/0199827 | A1 | 10/2004 | Muttik et al. |
| 2004/0243829 | A1 | 12/2004 | Jordan |
| 2004/0255165 | A1 | 12/2004 | Szor |
| 2005/0021994 | A1 | 1/2005 | Barton et al. |
| 2005/0039029 | A1 | 2/2005 | Shipp |
| 2005/0055558 | A1 | 3/2005 | Carmona |
| 2005/0071649 | A1 | 3/2005 | Shipp |
| 2005/0154900 | A1 | 7/2005 | Muttik |
| 2005/0172337 | A1 | 8/2005 | Bodorin et al. |
| 2005/0172338 | A1 | 8/2005 | Sandu et al. |
| 2005/0188272 | A1 | 8/2005 | Bodorin et al. |
| 2005/0223238 | A1 | 10/2005 | Schmid et al. |
| 2005/0262567 | A1 | 11/2005 | Carmona |
| 2005/0268112 | A1 | 12/2005 | Wang et al. |
| 2005/0268338 | A1 | 12/2005 | Made |
| 2005/0278783 | A1 | 12/2005 | Chien et al. |
| 2005/0278785 | A1 | 12/2005 | Lieberman |
| 2005/0283838 | A1 | 12/2005 | Saito |
| 2006/0112235 | A1 | 5/2006 | Cabot et al. |
| 2006/0123244 | A1 | 6/2006 | Gheorghescu et al. |
| 2006/0200863 | A1 | 9/2006 | Ray et al. |

OTHER PUBLICATIONS

Carey Nachenberg, Computer Virus-Coevolution, Jan. 1997, ACM, pp. 46-51.*

Linn et al., Obfuscation of Executable Code to Improve Resistance to Static Disassembly, 2003, ACM, pp. 290-299.*

DIMVA 2005 (2005 : Vienna, Austria), Detection of intrusions and malware, and vulnerability assessment : second international conference, DIMVA 2005, Vienna, Austria, Jul. 7-8, 2005 : proceedings/ Klaus Julisch, Christopher Kruegel (eds.). Berlin ; New York: Springer, 2005. x, 240 p. ill. ; 24 cm. pp. 1-18, 174-187.

Tittel, Ed., PC magazine fighting spyware, viruses, and malware / Ed Tittel. Indianapolis, IN : Wiley Pub., c2005. xv, 367 p. ill. ; 24 cm. pp. 328-330, 334-335.

Skoudis, Ed., Malware : fighting malicious code / Ed Skoudis with Lenny Zeltser. NJ : Prentice Hall Professional Technical Reference, c2004. xxii, 647 p. ill. ; 24 cm. pp. 590-601, 615-618.

Milenkovic' et al., "Using instruction block signatures to counter code injection attacks" (article)., ACM SIGARCH Computer Architecture News archive, vol. 33, Issue 1 (Mar. 2005). Special Issue: Workshop on architectural support for security and anti-virus (WASSA) table of contents, pp. 108-117 Year of Publication: 2005 ISSN:0163-5964. ACM Press. New York, NY.

Rabek et al, "Detection of injected, dynamically generated, and obfuscated malicious code" Source Workshop on Rapid Malcode archive; Proceedings of the 2003 ACM workshop on Rapid malcode table of contents Washington, DC, USA SESSION: Defensive technology pp. 76-82 Year of Publication: 2003 ISBN:1-58113-785-0 Sponsors—SIGSAC: ACM Special Interest Group on Security, Audit, and Control ACM: Association for Computing Machinery. ACM Press New York, NY.

Whittaker et al., "Neutralizing windows-based malicious mobile code", Symposium on Applied Computing archive Proceedings of the 2002 ACM symposium on Applied computing, Madrid, Spain. SESSION: Computer security table of contents pp. 242-246 Year of Publication: 2002 ISBN:1-58113-445-2. Sponsor: SIGAPP: ACM Special Interest Group on Applied Computing. ACM Press,New York, NY.

Singh et al., "Analysis and detection of computer viruses and worms: an annotated bibliography", ACM SIGPLAN Notices archive, vol. 37, Issue 2 (Feb. 2002) COLUMN: Technical correspondence, pp. 29-35, ISSN:0362-1340, ACM Press New York, NY, USA.

Nachenberg, "Computer virus-antivirus coevolution", Communications of the ACM archive. vol. 40, Issue 1 (Jan. 1997), pp. 46-51, ISSN:0001-0782 Symantec Antivirus Research Center, Symantec Corp., Santa Monica, Calif. ACM Press New York, NY.

Erbschloe, Trojans, Worms, and Spyware: A Computer Security Professional's Guide to Malicious Code, MA: Elsevier Butterworth-Heinemann, 2005. pp. 185-189.

Harley, et al., Viruses Revealed, CA: Osborne/McGraw-Hill Publishers, 2001. pp. 219-225, 228-229.

List of Several Anti-Spyware Vendors/Producers appearing prominently on the Internet (current date), unknown.

International Search Report, PCT/US 06/14004, Jan. 22, 2007.

International Search Report; PCT/US2006/014003.

Office Action mailed on Apr. 6, 2007 from USPTO for U.S. Appl. No. 11/105,977.

Office Action mailed on Sep. 20, 2007 from USPTO for U.S. Appl. No. 11/106,122.

International Search Report and Written Opinion, PCT/US06/14405, Nov. 29, 2007.

Office Action Dated Dec. 28, 2007 for U.S. Appl. No. 11/105,977.

* cited by examiner

SYSTEM AND METHOD FOR SCANNING OBFUSCATED FILES FOR PESTWARE

RELATED APPLICATIONS

The present application is related to the following commonly owned and assigned applications: application Ser. No. 11/105,977 entitled: System and Method for Scanning Memory for Pestware Offset Signatures filed herewith; application Ser. No. 11/106,122 entitled: *System and Method for Scanning Memory for Pestware*, filed herewith. Each of which is incorporated by reference in their entirety.

FIELD OF THE INVENTION

The present invention relates to computer system management. In particular, but not by way of limitation, the present invention relates to systems and methods for controlling pestware or malware.

BACKGROUND OF THE INVENTION

Personal computers and business computers are continually attacked by trojans, spyware, and adware, collectively referred to as "malware" or "pestware." These types of programs generally act to gather information about a person or organization—often without the person or organization's knowledge. Some pestware is highly malicious. Other pestware is non-malicious but may cause issues with privacy or system performance. And yet other pestware is actual beneficial or wanted by the user. Wanted pestware is sometimes not characterized as "pestware" or "spyware." But, unless specified otherwise, "pestware" as used herein refers to any program that collects and/or reports information about a person or an organization and any "watcher processes" related to the pestware.

Software is available to detect and remove pestware by scanning a system for files stored in a data storage device (e.g., disk) on a file by file basis and comparing information from each of the files with known pestware definitions. Problematically, generators of pestware are obfuscating pestware files (e.g., by encrypting and/or compressing them) so as to create pestware files that, at the very least, are very difficult to identify by comparing them with known pestware definitions. As a consequence, existing software often leaves obfuscated files in the system because of uncertainty whether the file is associated with a desired application. Accordingly, current software is not always able to scan and remove pestware in a convenient manner and will most certainly not be satisfactory in the future.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the present invention include methods for scanning files of a protected computer for pestware. One embodiment for example, is configured to scan files on a protected computer by scanning a plurality of files in at least one file storage device of the protected computer. An obfuscated file is then identified from among the plurality of files in the at least one file storage device, wherein one or more potential pestware processes running in memory are associated with the obfuscated file. The obfuscated file is analyzed so as to identify, from among a plurality of processes running in the memory, the one or more potential pestware processes running in memory that are associated with the obfuscated file. Information from at least one of the one or more potential pestware processes running in memory is then retrieved and analyzed so as to determine whether the one or more potential pestware processes running in memory is pestware. In variations, the obfuscated pestware file is run in a simulation mode (e.g., a debug mode) so as to allow scanning of the obfuscated file as it would exist in executable memory. In this way, the obfuscated file may be analyzed so as to obtain one or more starting addresses of the one or more processes associated with the obfuscated file.

In another embodiment, the invention may be characterized as a system for managing pestware. In this embodiment, a pestware detection module is configured to detect pestware on a protected computer, which includes a file storage device and a an executable memory. The pestware detection module configured to scan a plurality of files in the file storage device of the protected computer and identify an obfuscated file from among the plurality of files in the at least one file storage device, wherein one or more potential pestware processes running in executable memory are associated with the obfuscated file. The obfuscated file is analyzed by the pestware detection module so as to identify, from among a plurality of processes running in the memory, the one or more potential pestware processes running in memory that are associated with the obfuscated file. Information from at least one of the one or more potential pestware processes running in memory is then retrieved by the pestware detection module and analyzed so as to determine whether the one or more potential pestware processes running in memory is pestware These and other embodiments are described in more detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

According to several embodiments, the present invention enables obfuscated files and their associated process(es) to be analyzed so as to determine whether the file and/or process(es) are pestware.

Figure 1:
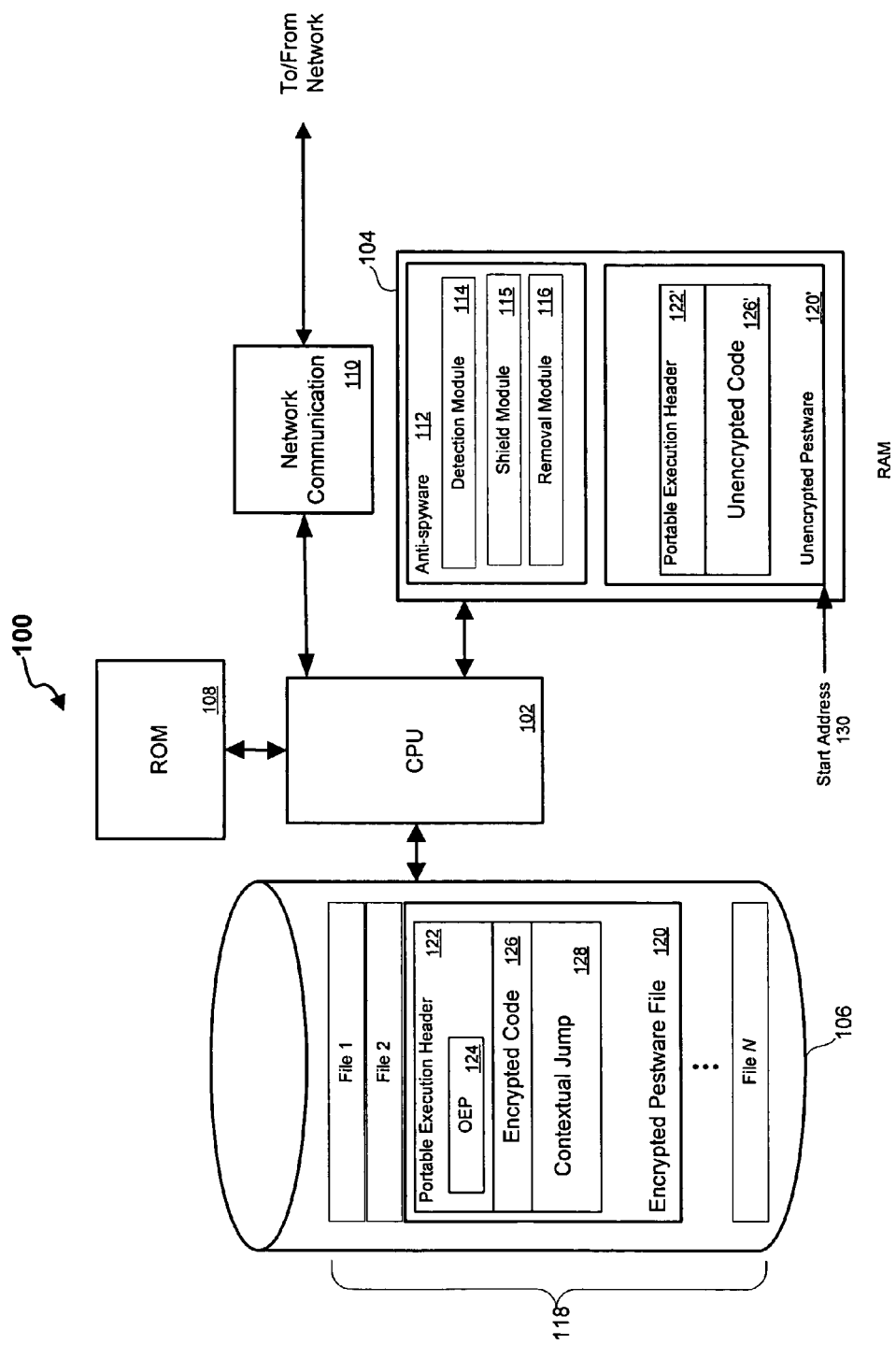
FIG. 1 illustrates a block diagram of a protected computer in accordance with one implementation of the present invention.

Referring first to FIG. 1, shown is a block diagram 100 of a protected computer/system in accordance with one implementation of the present invention. The term "protected computer" is used herein to refer to any type of computer system, including personal computers, handheld computers, servers, firewalls, etc. This implementation includes a CPU 102 coupled to memory 104 (e.g., random access memory (RAM)), a file storage device 106, ROM 108 and network communication 110.

As shown, the storage device 106 provides storage for a collection of N files 118 including an encrypted pestware file 120. The storage device 106 is described herein in several implementations as hard disk drive for convenience, but this is certainly not required, and one of ordinary skill in the art will recognize that other storage media may be utilized without departing from the scope of the present invention. In addition, one of ordinary skill in the art will recognize that the storage device 106, which is depicted for convenience as a single storage device, may be realized by multiple (e.g., distributed) storage devices.

As shown, an anti-spyware application 112 includes a detection module 114, a shield module 115 and a removal module 116, which are implemented in software and are executed from the memory 104 by the CPU 102. In addition, an unencrypted pestware process 120' corresponding to the encrypted pestware file 120 (e.g., spawned from the encrypted pestware file 120) is also depicted as running from memory 104.

The software 112 can be configured to operate on personal computers (e.g., handheld, notebook or desktop), servers or any device capable of processing instructions embodied in executable code. Moreover, one of ordinary skill in the art will recognize that alternative embodiments, which implement one or more components (e.g., the anti-spyware 112) in hardware, are well within the scope of the present invention.

In the exemplary embodiment depicted in FIG. 1, the encrypted pestware file 120 is obfuscated (i.e., known techniques for comparing the pestware file 102 with pestware definitions are ineffective and/or inefficient). For example, known encryption techniques (e.g., variations of UPX) incorporate proprietary and/or randomization schemes that render known techniques that match known pestware definitions with suspect files ineffective. Consequently, typical scanning techniques are unable to determine that the encrypted pestware file 120 was the source of the unencrypted pestware 120'. As a consequence, attempts to remove the pestware process 120' by simply terminating it leave the encrypted pestware file 120 in place to reinitiate the unencrypted pestware process 120'.

Although the exemplary embodiment depicted in FIG. 1 involves encryption as one technique for obfuscating pestware files, the present invention is also applicable to detect files obfuscated by various means. For example, and without limitation, variations of the present invention are applicable to analyze files obfuscated with common packing algorithms (e.g., UPX, Aspack, FSG, PECompact) as well as files obfuscated by the following obfuscation techniques: 1) compression techniques; 2) weak encryption (e.g. carrying out XOR operations on the file); 3) proprietary encryption/compression, which may utilize variations of known packing routines; file repackaging, which involves the file re-encrypting/compressing itself after being run (e.g., after the file is run, the file grabs data from the machine or internet then repackages itself and writes its new copy to disk); and 5) separating the file into parts such that the file, in the form of multiple segments, is not executable, but once packaged together becomes an executable file.

In accordance with several embodiments of the present invention, the detection module 114 is configured to scan files located on the data storage device 106 so as to identify both obfuscated (e.g., encrypted pestware) as discussed further herein and pestware that is identifiable by established techniques (e.g., by comparing information in the files with known pestware definitions.)

Figure 2:
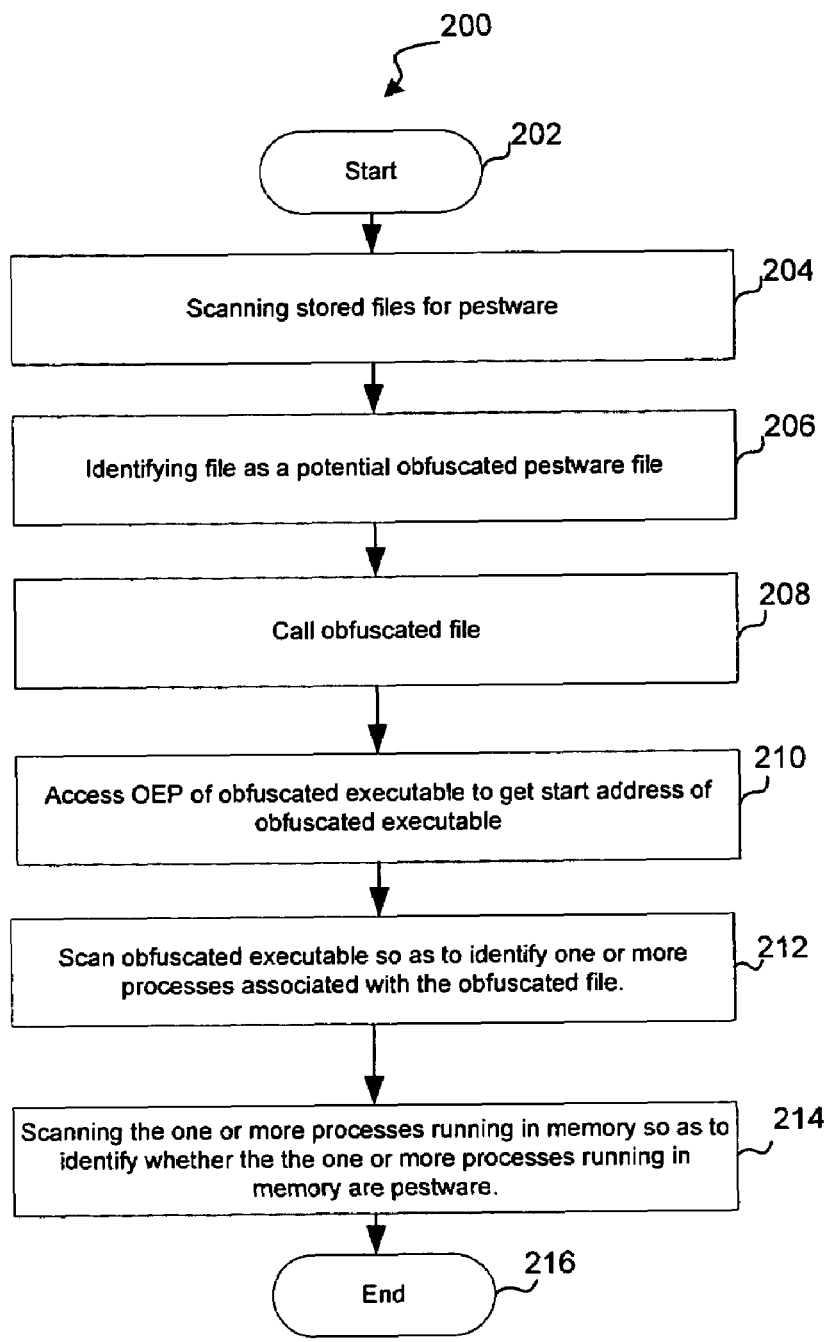
FIG. 2 is a flowchart of one method for identifying pestware in accordance with an embodiment of the present invention.

While referring to FIG. 1, simultaneous reference will be made to FIG. 2, which is a flowchart depicting steps traversed in accordance with a method for identifying pestware files. In some embodiments, each of the N files 120 in the data storage device 106 are scanned so as to identify known pestware in accordance with known techniques (e.g., comparing each file with known pestware definitions) (Blocks 202, 204).

In addition, in the exemplary embodiment, each of the files in the data storage device 106 is assessed so as to identify whether each file is a potential obfuscated pestware file (Block 206). In other words, each of the file is scanned for indicia that the file is obfuscated. For example, each of the N files 118 may be scanned to identify whether the files use the get_proc_address and load_library_application program interfaces (APIs), but one of ordinary skill in the art will recognize that the scan correlations used to identify obfuscated files are certainly not limited to identifying these two APIs.

In the exemplary embodiment, once a file (e.g, the encrypted pestware file 120) is identified as a potential obfuscated pestware file, it is "called" (e.g., using the Call command with a WINDOWS operating system) so as to simulate execution of the file without the file actually running in executable memory (e.g., memory 104) (Block 208). In this way, an original entry point (OEP) (e.g., the OEP 124) in the portable execution header (e.g., the portable execution header 122) may be identified so as to obtain (e.g., calculate) where the loader would start in executable memory (Block 210).

As shown, after the start address of the encrypted executable is identified from running the encrypted file in simulation mode (e.g., debug mode), the encrypted executable is scanned so as to identify locations of one or more processes running in memory that are associated with the obfuscated file (Block 212). In one embodiment, the encrypted executable is scanned in the simulation mode for a contextual jump (e.g., the contextual jump 128), which identifies, relative to the start address identified in block 210, where the one or more associated processes (e.g., the unencrypted pestware 120') are located in memory (e.g., the memory 104).

In instances where there are multiple processes (e.g., watcher processes), there may be multiple contextual jumps to the multiple processes, which are identified in a jump table. In these instances, the jump table is accessed so as to identify the contextual jump for each of the processes associated with the encrypted file. In some embodiments, once the contextual jump(s) is identified, it is patched with the location of the function used to call the encrypted file, and as a consequence, the encrypted executable running in simulation mode is ended.

After the one or more processes (e.g., the unencrypted pestware 120') are identified as being associated with the obfuscated file (e.g., the encrypted pestware 120), the one or more processes associated with the obfuscated file are scanned so as to identify whether they are pestware processes (Blocks 214 and 216). If the associated one or more processes are pestware, then the processes are terminated and the obfuscated file is removed from the file storage device 106. In some embodiments, the associated process(es) are sequentially scanned in accordance with known techniques to identify textual information indicative of pestware.

Figure 3:
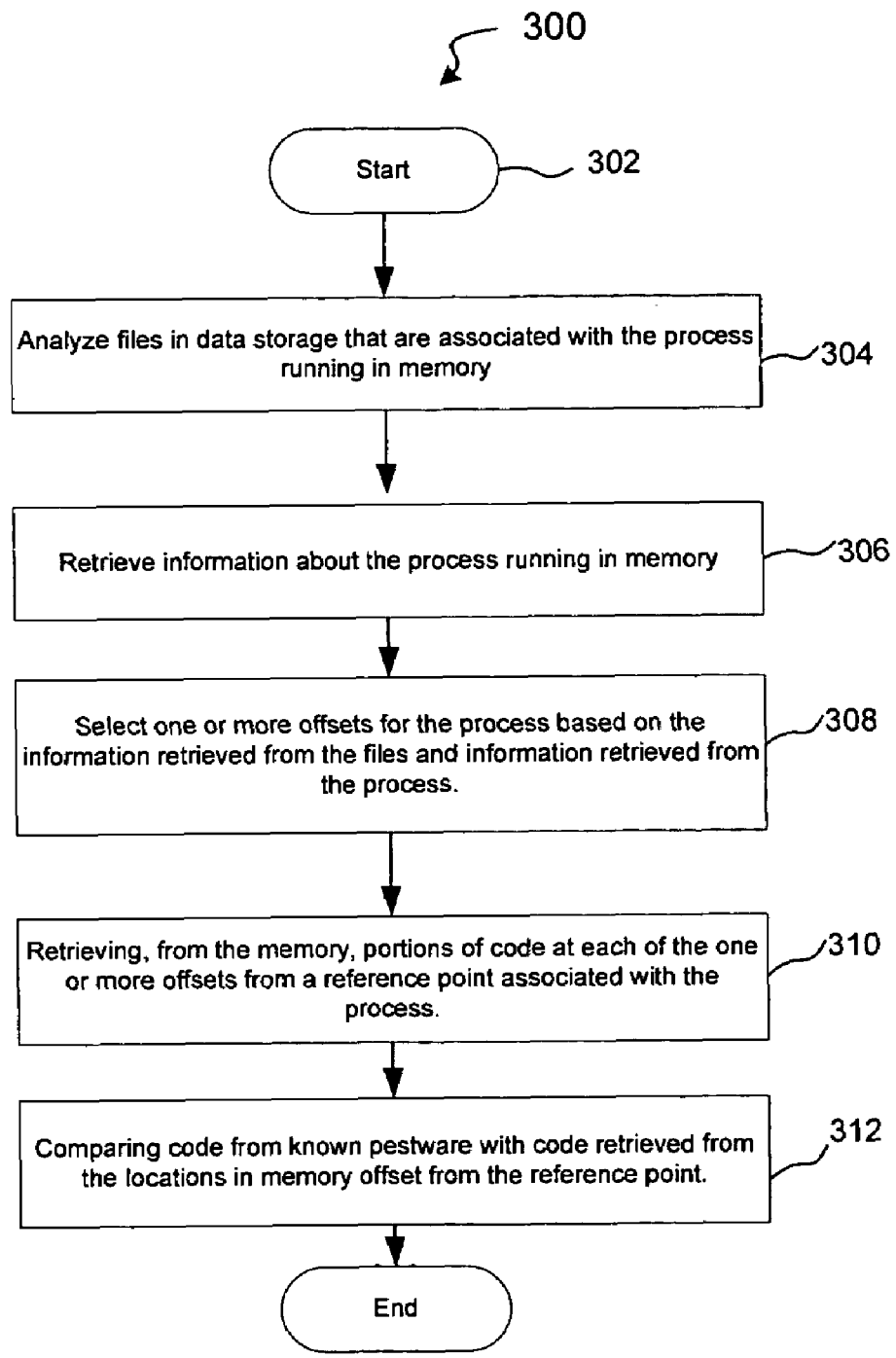
FIG. 3 is a flowchart depicting steps carried out while scanning a potential pestware process in accordance with variations of the present invention.

In other embodiments, as depicted in FIG. 3 for example, a process that is associated with the obfuscated file is scanned by scanning the process at selected offsets from a reference point associated with the process. As discussed further herein, the reference point in one embodiment is the starting address (e.g., the starting address 130) of the associated process, and in another embodiment, the reference point is one or more API implementations. Beneficially, scanning only portions of a process (i.e., at one or more selected offsets from a base reference point) substantially reduces the amount of time to scan and compare portions of the process with indicia of pestware.

In several variations of this offset scanning technique, the information retrieved at the offset(s) is a portion of executable code (as opposed to strings or flat Unicode text). In this way, the identification of pestware is much more accurate because the executable code that is scanned is very specific to known pestware. As a consequence, the frequency of false positive identifications of the process as pestware is substantially reduced.

Referring next to FIG. 3, shown is a flowchart depicting steps carried out in accordance with a dynamic offset scanning technique in accordance with several embodiments of the present invention. In general, the offset scanning technique in these embodiments scans, utilizing offsets from a base location (e.g., a start address and/or an API implementation) only portions of the executable memory that are associated with each of the processes (e.g., the N processes) so as to scan the processes quickly. But the portions of the executable memory that are scanned are selected so as to provide for very effective scanning. Moreover, in many variations of the present invention, the information obtained from the selected portions of the executable memory is op code (e.g., X86 assembly instructions) that provides very specific information about the processes so as to avoid false positives.

As shown in FIG. 3 with simultaneous reference to FIG. 1, in some embodiments, portions of the encrypted pestware 120 are scanned along with portions of the unencrypted pestware process 120' so as to provide an initial assessment of the potential types of pestware processes that the unencrypted pestware 120' may be (Blocks 302, 304, 306).

Based upon the information gathered with the initial scans (Blocks 304, 306), specific offsets are selected for scanning the unencrypted pestware 120' (Block 308). In one embodiment for example, a partial scan of the encrypted pestware file 120 may reveal that it is encrypted code packed by a specific packer, and as a consequence, a specific offset known to be associated with pestware utilizing that packer may be utilized, while other offsets known to be associated with other types of pestware are not utilized. In this way, the pestware may be effectively and efficiently scanned.

Again the base reference point from which to perform the offset scanning may be either the start address 130 and/or another portion of the code (e.g., an API implementation). Although pestware may morph its size or starting addresses, the relative offsets of specific code within the pestware process frequently remains static. In this way, once an API is identified, for example, a scan at a specific offset from the API implementation is an effective way to identify pestware when that offset in the pestware is known to contain specific code.

As shown in FIG. 3, once one or more offsets are selected, portions of code are retrieved from locations in memory 104 that are located at the selected offsets from the base reference location (e.g., the start address 130) (Block 310). The code that is retrieved from memory at the locations that are offset from a reference base of the unencrypted pestware 120' is then compared with code associated with known pestware so as to determine whether the unencrypted pestware 102' is a particular type of pestware (Block 312).

As discussed, in several embodiments, the code retrieved at the offsets is op code (as opposed to strings or flat Unicode text). In this way, the identification of pestware is much more accurate because the op code associated with known pestware is very specific to the pestware. As a consequence, the frequency of false positive identifications of the process as pestware is substantially reduced. Additional details of offset scanning of processes and process dependencies is found in the above-identified application entitled: *System and Method for Scanning Memory for Pestware*, which is filed herewith and is incorporated by reference in its entirety.

It should be recognized that the process depicted in FIG. 3 is exemplary only and that one of ordinary skill in the art will appreciate that one or more steps may be varied and or omitted without departing from the scope of the present invention. For example, the steps enumerated by blocks 304 and 306 may be varied or omitted, and the unencrypted pestware process may be scanned by scanning the process at various offsets from the start address 130 without narrowing the number of offsets based upon an initial assessment of either the encrypted file 120 or the unencrypted pestware 120.

In conclusion, the present invention provides, among other things, a system and method for managing pestware. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for scanning files on a protected computer for pestware comprising:

scanning a plurality of files in at least one file storage device of the protected computer;

identifying an obfuscated file from among the plurality of files in the at least one file storage device, wherein one or more potential pestware processes running in memory are associated with the obfuscated file;

analyzing the obfuscated file so as to identify, from among a plurality of processes running in the memory, the one or more potential pestware processes running in memory that are associated with the obfuscated file;

retrieving information from at least one of the one or more potential pestware processes running in memory; and analyzing the information from the at least one of the one or more potential pestware processes running in memory so as to determine whether the one or more potential pestware processes running in memory is pestware, wherein the analyzing the obfuscated file includes running the obfuscated file in a simulation mode and scanning through the obfuscated file while it is being run in the simulation mode so as to obtain a start address of the one or more potential pestware processes running in memory that are associated with the obfuscated file, and wherein the analyzing the obfuscated file includes identifying a start address of the one or more potential pestware processes by identifying one or more contextual jumps in the obfuscated file as it is being run in the simulation mode.

2. The method of claim 1, wherein the identifying includes identifying the obfuscated file as an encrypted file.

3. The method of claim 1, wherein the identifying includes identifying the obfuscated file as a compressed file.

4. The method of claim 1, wherein the retrieving includes retrieving the information at a predefined offset from a start address of the one of the one or more potential pestware processes running in memory.

5. The method of claim 4, wherein the retrieving includes retrieving op code at the predefined offset from the start address of the one of the one or more potential pestware processes running in memory, and wherein the analyzing includes comparing the op code with op code substantially unique to known pestware.

6. The method of claim 1, wherein, upon identifying the contextual jump, patching the contextual jump with the location of a function used to call the obfuscated file in the simulation mode.

7. A system for managing pestware comprising:
a pestware removal module configured to remove pestware on a protected computer, the protected computer including at least one file storage device and a program memory; and
a pestware detection module configured to:
scan a plurality of files in at least one file storage device of the protected computer;
identify an obfuscated file from among the plurality of files in the at least one file storage device, wherein one or more potential pestware processes running in memory are associated with the obfuscated file;
analyze the obfuscated file so as to identify, from among a plurality of processes running in the memory, the one or more potential pestware processes running in memory that are associated with the obfuscated file;
retrieve information from at least one of the one or more potential pestware processes running in memory; and
analyze the information from the at least one of the one or more potential pestware processes running in memory so as to determine whether the one or more potential pestware processes running in memory is pestware,
wherein the pestware detection module is configured to identify a start address of the one or more potential pestware processes running in memory that are associated with the obfuscated file, and
wherein the pestware detection module is configured to identify the start address by locating a contextual lump in the obfuscated file.

8. The system of claim 7, wherein the pestware detection module is configured to identify the obfuscated file as an encrypted file.

9. The system of claim 7, wherein the pestware detection module is configured to identify the obfuscated file as a compressed file.

10. The system of claim 7, wherein the pestware detection module is configured to retrieve the information at a predefined offset from a start address of the at least one of the one or more potential pestware processes running in memory.

11. The system of claim 10, wherein the pestware detection module is configured to retrieve op code at the predefined offset from the start address of the at least one of the one or more potential pestware processes running in memory, and wherein the pestware detection module is configured to compare the op code with op code substantially unique to known pestware.

12. The system of claim 7, wherein the pestware detection module is configured to analyze the obfuscated file by:
executing the obfuscated file in a simulation mode;
scanning the obfuscated file as it is being run in simulation mode so as to identify a portable executable header, an original entry point in the portable executable header and the at least one contextual jump; and
obtaining, utilizing the original entry point, a reference address;
wherein one or more start addresses for one or more potential pestware processes are identified by utilizing the at least one contextual jump and the reference address.

13. A computer readable medium encoded with instructions for scanning files on a protected computer for pestware, the instructions including instructions for:
scanning a plurality of files in at least one file storage device of the protected computer;
identifying an obfuscated file from among the plurality of files in the at least one file storage device, wherein one or more potential pestware processes running in memory are associated with the obfuscated file;
analyzing the obfuscated file so as to identify, from among a plurality of processes running in the memory, the one or more potential pestware processes running in memory that are associated with the obfuscated file;
retrieving information from at least one of the one or more potential pestware processes running in memory; and
analyzing the information from the at least one of the one or more potential pestware processes running in memory so as to determine whether the one or more potential pestware processes running in memory is pestware,
wherein the analyzing the obfuscated file includes running the obfuscated file in a simulation mode and scanning through the obfuscated file while it is being run in the simulation mode so as to obtain a start address of the one or more potential pestware processes running in memory that are associated with the obfuscated file, and
wherein the analyzing the obfuscated file includes identifying a start address of the one or more potential pestware processes by identifying one or more contextual jumps in the obfuscated file as it is being run in the simulation mode.

14. The computer readable medium of claim 13, wherein the instructions for identifying the obfuscated file include instructions selected from the group consisting of instructions for identifying an encrypted file and instructions for identifying a compressed file.

15. The computer readable medium of claim 13, wherein the instructions for analyzing include instructions for identifying a start address of the one or more potential pestware processes running in memory that are associated with the obfuscated file.

16. The computer readable medium of claim 13, wherein the instructions for analyzing include instructions for identifying a specific API implementation, and instructions for retrieving executable code from one or more offsets in the memory from the specific API implementation.

* * * * *